United States Patent
Gundrum et al.

(10) Patent No.: US 10,871,399 B2
(45) Date of Patent: Dec. 22, 2020

(54) ANALYSIS DEVICE

(71) Applicant: LASER-LABORATORIUM GÖTTINGEN E.V., Göttingen (DE)

(72) Inventors: Lars Gundrum, Göttingen (DE); Julian Born, Göttingen (DE); Hainer Wackerbarth, Kassel (DE); Zheng Wang, Göttingen (DE); Fabian Dach, Göttingen (DE)

(73) Assignee: Laser-Laboratorium Göttingen E.V.

( * ) Notice: Subject to any disclaimer, the term of this patent is extended or adjusted under 35 U.S.C. 154(b) by 0 days.

(21) Appl. No.: 16/604,743

(22) PCT Filed: Apr. 12, 2018

(86) PCT No.: PCT/DE2018/100347
§ 371 (c)(1),
(2) Date: Oct. 11, 2019

(87) PCT Pub. No.: WO2018/188699
PCT Pub. Date: Oct. 18, 2018

(65) Prior Publication Data
US 2020/0103280 A1    Apr. 2, 2020

(30) Foreign Application Priority Data

Apr. 13, 2017   (DE) .......................... 10 2017 108 120

(51) Int. Cl.
    *G01J 3/44*    (2006.01)
    *G01N 21/65*   (2006.01)
    *G01N 21/41*   (2006.01)

(52) U.S. Cl.
    CPC ............ *G01J 3/4412* (2013.01); *G01N 21/65* (2013.01); *G01N 21/41* (2013.01)

(58) Field of Classification Search
    CPC ................. G01N 21/65; G01N 21/658; G01N 2021/656; G01J 3/44; G01J 3/02
    (Continued)

(56) References Cited

U.S. PATENT DOCUMENTS 6,240,790 B1   6/2001   Swedberg et al.
6,562,307 B1   5/2003   Schuch et al.
(Continued)

FOREIGN PATENT DOCUMENTS

DE    69110032 T2    12/1995
DE    19952764 A1     5/2000
(Continued)

OTHER PUBLICATIONS

German Search Report for German Application No. 10 2017 108 120.8, with English translation, dated Jan. 16, 2018, 12 pages.
(Continued)

*Primary Examiner* — Md M Rahman
(74) *Attorney, Agent, or Firm* — RatnerPrestia

(57) ABSTRACT

A device includes a computing unit connectable to a Raman spectrometer, refractometer, and database. Data sets represent fluids, active substances and/or active substance combinations. The device can subject a fluid, active substance, or active substance combination to a Raman spectroscopic measurement. The computing unit can identify the fluid, active substance, or active substance combination as Raman active or Raman inactive. The device can also subject the fluid, active substance, or active substance combination to a refractive index measurement. The computing unit can compare the second result with the first result to obtain a final result in the event of a detected Raman activity, and adopt the second result as the final result in the event of a detected Raman inactivity. The computing unit can compare the final
(Continued)

result with the data sets to identify an incorrect/unintended fluid, active substance, or active substance combination.

7 Claims, 8 Drawing Sheets

(58) Field of Classification Search
USPC .......................................................... 356/301
See application file for complete search history.

(56) References Cited

U.S. PATENT DOCUMENTS

| | | | |
|---|---|---|---|
| 6,613,560 | B1 | 9/2003 | Tso et al. |
| 8,452,363 | B2 | 5/2013 | Müller et al. |
| 9,200,935 | B2 | 12/2015 | Braum et al. |
| 2003/0048432 | A1 | 3/2003 | Jeng et al. |
| 2003/0148291 | A1 | 8/2003 | Robotti |
| 2003/0224531 | A1 | 12/2003 | Brennen et al. |
| 2004/0155516 | A1* | 8/2004 | Colussi ................ B60C 23/003 301/5.24 |
| 2007/0201025 | A1 | 8/2007 | Greenwald |
| 2009/0009764 | A1* | 1/2009 | Slepicka ............... A61M 1/288 356/370 |
| 2010/0050737 | A1 | 3/2010 | Wolters |
| 2012/0212812 | A1* | 8/2012 | Weber .................. G03B 21/604 359/454 |
| 2013/0171685 | A1 | 7/2013 | Schütze et al. |
| 2014/0226158 | A1* | 8/2014 | Trainer ................ G01J 3/0218 356/336 |
| 2016/0146722 | A1 | 5/2016 | Koerner et al. |
| 2017/0059516 | A1* | 3/2017 | Rearick ............. G01N 27/4145 |
| 2018/0280723 | A1* | 10/2018 | Enwemeka .......... A61N 5/0616 |
| 2019/0374092 | A1* | 12/2019 | Wu ......................... A61B 1/07 |

FOREIGN PATENT DOCUMENTS

| | | |
|---|---|---|
| DE | 19931901 A1 | 1/2001 |
| DE | 10106008 A1 | 9/2001 |
| DE | 10256931 A1 | 8/2003 |
| DE | 10309583 A1 | 12/2003 |
| DE | 69532741 T2 | 1/2005 |
| DE | 69535259 T2 | 1/2007 |
| DE | 69535176 T2 | 8/2007 |
| DE | 69636653 T2 | 10/2007 |
| DE | 69535608 T2 | 7/2008 |
| DE | 102010023099 B3 | 11/2011 |
| DE | 102014009154 A1 | 12/2015 |
| EP | 0517930 B1 | 5/1995 |
| EP | 1295107 A1 | 3/2003 |
| EP | 0708331 B1 | 3/2004 |
| EP | 1545659 A1 | 6/2005 |
| EP | 0734282 B1 | 8/2006 |
| EP | 0734281 B1 | 10/2006 |
| EP | 0821791 B1 | 10/2006 |
| EP | 1162455 B1 | 10/2007 |
| EP | 1882446 A1 | 1/2008 |
| EP | 2470063 A2 | 7/2012 |
| JP | 2005233928 A | 9/2005 |
| WO | 0201202 A1 | 1/2002 |
| WO | 2004033003 A1 | 4/2004 |
| WO | 2011028519 A2 | 3/2011 |
| WO | 2013026871 A1 | 2/2013 |

OTHER PUBLICATIONS

International Preliminary Report on Patentability for International Application No. PCT/DE2018/100347, dated Oct. 15, 2019, 13 pages.

International Search Report and Written Opinion for International Application No. PCT/DE2018/100347, dated Oct. 10, 2018, 12 pages.

Komsta, L., "Chemometric Detection of Acetaminophen in Pharmaceutical by Infrared Spectroscopy Combined with Pattern Recognition Techniques: Comparison of Attenuated Total Reflectance-FTIR and Raman Spectroscopy", Journal of AOAC International, vol. 94, No. 3, 2011, pp. 743-749.

Pitt et al., "Engineering Aspects and of the New Raman Instrumentation", IEE Proc. Sci. Meas. Technol., vol. 152, No. 6, Nov. 2005, pp. 241-318.

* cited by examiner

| Substance | Raman active | Raman inactive | Refraction number |
|---|---|---|---|
| Insulin | Yes | No | Confirmation/optimization |
| Heparin | Yes | No | Confirmation/optimization |
| Glucose | Yes | No | Confirmation/optimization |
| NaBic | Yes | No | Confirmation/optimization |
| NaCL | No | Yes | Classification |
| KCl | No | Yes | Classification |

Fig. 5

ANALYSIS DEVICE

CROSS REFERENCE TO RELATED APPLICATIONS

This application is the United States national phase entry of International Application No. PCT/DE2018/100347, filed Apr. 12, 2018, which claims the benefit of priority of German Application No. 10 2017 108 120.8, filed Apr. 13, 2017. The contents of International Application No. PCT/DE2018/100347 and German Application No. 10 2017 108 120.8 are incorporated by reference herein in their entireties.

FIELD

The present invention relates to a device, preferably adapted for medical use, for identifying fluids, preferably incorrect active substances, active substance combinations, and/or solutions in infusion containers, syringes/syringe pumps and similar supply devices, which device will also be referred to as analysis device in the following. Furthermore, the present invention relates to a method for identifying fluids, preferably incorrect active substances, active substance combinations, and/or solutions in infusion containers, syringes/syringe pumps and similar supply devices, in particular by using the analysis device in accordance with the invention.

The present invention deals with the development of a (fluid) analysis device especially (but not exclusively) for medical use. The analysis device is to identify and display an incorrect infusion solution, for instance, a drug drawn in/inserted in a drug supply device, by comparison with a predefined drug assortment stored in a database, destined for the intravenous administration to a patient. An infusion solution thus also comprises drugs administered by means of a syringe pump.

The analysis device combines two measuring methods, namely
  Raman spectroscopy and
  refractometry,
in order to cover an analysis spectrum of fluids which is as wide as possible. Refractometry is necessary to differentiate fluids such as NaCl or KCl solutions since this is not possible by means of Raman spectroscopy.

BACKGROUND

The analysis of fluids is necessary in many fields of everyday life. Predominantly in medicine where errors in administration may have serious consequences for a patient.

Possibilities for identifying substances in fluids and for determining the concentration of these substances do already exist. The majority of these possibilities uses devices in which a sensor is in direct contact with a fluid to be measured, or is brought into direct contact with a fluid to be measured by means of a procedure. This means that either the sensor has to be positioned permanently in a fluid path, or part of the fluid has to be taken and be supplied to a sensor or to an analysis device, or a sensor has to be inserted in the fluid. In the case of a direct contact of the sensors with a fluid the sensors have to be cleaned or even exchanged each time between the measurements, and if a fluid is taken, an amount of fluid is removed from a predefined volume. In order to avoid this, contactless measuring systems are preferably used, which are not in direct contact with the fluid to be measured. Therefore, systems working with electromagnetic radiation offer a way out here. Especially optical systems are thus suitable for the analysis of fluids since they offer a touchless possibility of analyzing fluids and have a negligible influence on the specimen.

Optical methods for diagnostics are indispensable in medicine, above all since they provide non-invasive (contactless) or minimally invasive methods for examining fluids. In such examination methods the interaction of light with matter, more exactly with medical fluids, is used to obtain information about the composition and the concentration of the fluid. In this process, laser light or light with a broad spectrum is radiated into the matter and the transmitted or back-scattered light is measured. In other words, an optical method allows a non-destructive, non-invasive measurement without complex specimen preparation.

Refractometry is an optical measuring method which deals with the determination of the refractive index (also called refraction number, refraction relation, or refraction exponent) of matter. In a method for determination of the refractive index the deflection of a light beam is detected during the transition from a first medium to a second medium. The deflection of the light beam provides conclusions about the second medium if the first medium is known. In a further method for determination of the refractive index the total reflection is determined which occurs during the transition of light between a medium with a higher refractive index to a medium with a lower refractive index from a particular angle on. Also in this method the refractive index of the second medium can be determined as long as the refractive index of the one medium is known. Refractometry thus uses the difference in the refractive index between two media. It is also important to note that the refractive index n depends on the wavelength of the light source used and on the temperature of the medium. If the composition of a fluid is known, a refractometer may, for instance, be used to determine the concentration of the respective components of the fluid by means of the refractive index if only one single further solved component exists apart from the carrier solution.

Raman spectroscopy is a spectroscopic examination of the inelastic scattering of light on molecules or solid bodies. The matter to be examined is irradiated with light (monochromatic light, laser radiation) and the scattered light is, preferably wavelength-selectively, detected and evaluated. In the light scattered on the matter, further frequencies apart from the excitation frequency are also detected. The frequency differences between the irradiated light and the scattered light provide conclusions about the irradiated matter. An advantage of Raman spectroscopy is that a simple measurement of all states of aggregation is possible, but above all that aqueous solutions can be examined. Since normally the diameter of the exciting laser beam is very small, the spectroscopic examination requires only the smallest amounts of specimen. Raman spectra comprise much information which allows, by the evaluation, conclusions with respect to a substance, preferably the structure and the binding, and hence with respect to the detected molecules.

Medical fluids are often administered to a patient by means of various drug supply devices and/or infusion solution supply devices (e.g. syringe pumps), for instance, in dialysis or if the patient needs continuous and permanent supply of drugs. The fluid may be a drug and/or an infusion solution, a solved drug, or a solution. The correct composition and the correct concentration of the drug and/or of the infusion solution are prescribed by the doctor. Deviations may lead to health damages.

A supply device (also drug supply unit and/or infusion solution supply unit) is a device supplying a drug and/or an infusion solution to a patient, e.g. syringe pumps. Syringe pumps (perfusors) are metering pumps for the intravenous administration of drugs and/or infusion solutions. They enable an adjustable metering and/or metering rate of drugs and/or infusion solution during a permanent treatment. The metering and/or metering rate of these syringe pumps is normally between 0.1 ml/h and 99.9 ml/h. When drugs and/or infusions are administered to a patient it is therefore often the case that a plurality of syringe pumps is arranged on top of each other and in parallel.

EP 1295107 relates to a device for the combined and simultaneous use of a plurality of physical measuring methods—for instance, of polarimetry, spectroscopy, refractometry, conductivity measurement, oximetry, pH value measurement, and ATR spectroscopy (ATR: "attenuated total reflection")—for the analysis especially of lowly concentrated components in a liquid multicomponent mixture, in particular in a miniaturizable form. The joint measuring beam for a simultaneous refractometric and ATR spectroscopic measurement which is irradiated into the reflection body and guided within the reflection body by mans of total reflections interacts with the material to be measured at the interface of the two media.

EP2470063 discloses a device and a method for determining the osmotic concentration, especially for diagnosing a "dry eye" of a patient. More precisely, EP2470063 relates to a device and a method for analyzing specimens of lacrimal fluid so as to determine the osmotic concentration of the tears, by means of salinity, and the protein concentration in the lacrimal fluid, which are indicators of dry eyes. The spectrophotometer system and the refractometer system share one prism, wherein the prism has a prism surface by which it is brought into contact with the tear specimen. The spectrophotometer system comprises a light source, for instance, a UV light-emitting diode, and an appropriate light detector for receiving transmitted light. The refractometer system comprises a light source and optics which are arranged to illuminate an interface between the prism surface and the tear specimen.

EP 1882446 also deals with the measurement of an analyte in a lacrimal fluid. For this purpose a portable measuring instrument for measuring at least one analyte in the lacrimal fluid, and an analytic measuring system are provided. Furthermore, this publication relates to a method for determining the concentration of at least one analyte in the body fluid which is used by the analytic measuring system. Such portable measuring instruments, analytic measuring systems, and methods are, for instance, used for the determination of blood glucose concentration. Thus, the known measuring system comprises preferably at least one of the following systems: an infrared (IR) spectroscopic measuring system, a near infrared (NIR) spectroscopic measuring system, a Raman spectroscopic measuring system, a UV/visible (UV/VIS) spectroscopic measuring system, a fluorescence measuring system, an impedance measuring system, a photo-acoustic measuring system, a circular-dichroitic measuring system, a refractometric measuring system, and an interferometric measuring system.

Finally, EP1545659 discloses a device and a method for the qualitative and quantitative determination of intravenous fluid components, in particular by using spectroscopy. Spectroscopy may be used for determining the fluid path components in intravenous infusions so as to avoid the occurrence of medication errors. Preferably, the analysis is performed by providing an EMR emission source and a detector at the opposite side of a fluid path, although other systems, such as Raman or reflection, may also be used.

Although different approaches for identifying fluids or fluid components have been developed from the state of the art, which provide i.a. also the combination of different measuring methods such as different spectroscopy methods and refractometry, it has not, or only insufficiently, been possible so far to identify incorrect fluids/active substances/active substance components and prevent their administration.

SUMMARY

In view of these facts it is an object of the present invention to provide a device, preferably adapted to the medical use, for identifying fluids (substances), preferably incorrect active substances, active substance combinations and/or solutions (infusion solutions), further preferably in infusion containers, syringes/syringe pumps and similar supply devices (in the following called "analysis device" for convenience), and an appropriate analysis method by which an incorrect fluid/active substance/active substance component/substance can be identified. In this process, no direct contact with the fluid to be measured between a sensor and the fluid is to occur, in other words, neither the method nor the device are to be invasive. In addition to the identification of the components of the fluid it shall also be possible to determine the concentration of the individual components. For instance, by means of the identification of the fluid, especially in the medial field, an incorrect administration of drugs or infusion solutions is to be prevented, wherein an infusion solution may also mean drugs, solved drugs or the like. Furthermore, it is a further object of the invention to enable the cost-efficient manufacturing of a device with Raman spectroscopy and refractometry which comprises high precision of measurements.

The gist of the invention consists accordingly in the manner of combination of Raman spectroscopy and refractometry in accordance with the invention, and/or the integrated use of the two measuring methods in one single instrument and/or in one single device. The device determines the Raman spectra of the fluid to be measured, the refractive index, and preferably the temperature. The results of the measurements are used for the identification of the fluid measured, more exactly for the classification and the measurement of the concentration. In other words, the components of the fluid and the concentration thereof are determined. Both measurements are performed in parallel and/or in series. Subsequently, the Raman result is evaluated and a differentiation is made between Raman active and Raman inactive.

The combination of the Raman spectroscopy and of the refractometry in one single instrument and/or one single device is achieved in that the instrument and/or the device comprises a Raman spectrometer and a refractometer.

The detection of whether Raman bands are available in the spectrum comprises the calculating of the first derivative of the Raman spectrum by means of an algorithm in an internal and/or in an external computing unit (processor). For this purpose the Raman spectrum is generally corrected with respect to the base lines and then processed with various methods or transformed, e.g. by means of Fourier transformation, Wavelet transformation, or the differentiation method. The local maxima of the processed Raman spectra which are higher than a defined threshold value are searched. If at least one local maximum exists, a Raman active substance is present. If no local maximum exists, a Raman inactive substance was detected. When determining the Raman active substances, noise can be suppressed, preferably by the setting of a predetermined threshold value (e.g. by using a noise filter). Thus, the analysis device determines/differentiates in a (preliminary) result whether Raman active and/or Raman inactive substances are present in the fluid, and subsequently, or in parallel, classifies/examines the (preliminary) result in accordance with the refractive index method so as to arrive at a confirmed final result.

In the event of a Raman active (preliminary) result (i.e. the Raman spectroscopy provides a comparable/usable result), the refractive index method which is applied in parallel and/or in series thus serves for the plausibility check of the (preliminary) result so as to subsequently arrive at a confirmed final result. In the event of a Raman inactive (preliminary) result (the Raman spectroscopy does not provide a comparable/usable result), the refractive index method applied in parallel and/or in series thus serves to provide a confirmed final result. The refractive index method according to the invention uses preferably the principle of total reflection.

If only Raman active substances are identified as a confirmed final result, the detected Raman bands are compared with an internal and/or external Raman database. This comparison enables an identification of the substance and/or a concentration detection of the substance. Alternatively, a weighting of the quality of the Raman spectrum may be performed prior to that. Then, a data fusion for a final result is performed.

If both, Raman active and Raman inactive substances are identified as a confirmed final result, the proceeding is in analogy to the Raman active substance. The detected Raman bands are compared with an internal and/or external Raman database and additionally the refractive index is now also compared with an internal and/or external refractive index database. These comparisons enable an identification of the substance and/or a concentration detection of the substance. Thus, this step comprises an additional classification with respect to water, NaCl or KCl. During the examination of the refractive index the database inquiry is thus extended to Raman inactive substances such as water, NaCl and KCl.

If only Raman inactive substances are identified as a confirmed final result, the substances are restricted to water, NaCl or KCl for classification. After a comparison with the refractive index database the substance is qualified and quantified, which again leads to a final result.

In any case the final result thus obtained is compared with data in a previously generated/established database which comprises correspondingly comparable data sets of normally administered fluids/active substances/active substance components. In other words, the final result, which constitutes an identification of the substance and the concentration of the substance, is compared with a stored data set. In the event of a missing concurrence the fluid/active substance/active substance component to be analyzed is assessed as "wrong" and a corresponding alarm is triggered and/or a signal is output and/or transmitted, and/or the use thereof is stopped. If a fluid/active substance/active substance component to be analyzed is assessed as "correct", an appropriate signal is output and/or transmitted. In other words, a notification is communicated at an instrument, a touch screen or a hospital's EDP and/or a medical information system (MIS).

In an advantageous embodiment the result of the refractive index measurement is compared for the individual substances/mixtures with corresponding functions of the refractive index which are compensating for the prevailing temperature after a temperature of the fluid to be measured was determined by means of a temperature sensor. The result may be output as an entry and as an error between the measured refractive index and a theoretical refractive index.

In an advantageous embodiment the final result may be produced by a data fusion by means of the comparison between the refractometer result for the concentration determination and the Raman result for the concentration determination. The deviations of the respectively calculated vector component of a result vector from the quantitative Raman result yield the error which is weighted and compared and examined for reliability with the error of the comparison of the refractive index. Confidence intervals are determined as a function of the individual errors. If both measurements lie outside the confidence intervals or the respectively other measurement, an error/alarm is output.

In other words, it is provided in accordance with the invention that fluids, solutions, active substances, or active substance combinations which are not Raman active are unambiguously identified on the basis of a simple refractive index measurement (preferably one wavelength). In this process it is utilized that, pursuant to the object of the measurement, Raman inactive solutions occur only in few defined concentrations such that an unambiguous assignment of a measurement value to an associated solution is also possible under consideration of typical measurement uncertainties. In all the other cases of Raman active fluids, solutions, active substances, or active substance combinations the refractive index measurement is referred to for plausibility check of the measurement results obtained by means of Raman spectroscopy so as to further increase the measurement certainty.

An alternative or additional method when connecting an infusion solution in a syringe pump is as follows. First, the pump is started, the syringe already filled is inserted, and the infusion tube is connected. Then, the respective application profile (e.g. insulin or KCl) is selected and started. The pump starts with the pump feed. This information is transferred to the analysis device, and the analysis device starts with the refractive index measurements. The flow measuring cell is constructed such that the optical window for the refractive index measurements is above the optical window for the Raman measurements. The inlet of the upright flow measuring cell is positioned at the bottom thereof so as to avoid that air bubbles may agglomerate in the flow measuring cell during filling. Since the flow measuring cell is empty at the beginning of the measurements, a change of the refractive index means that the flow measuring cell is filled. The analysis automat then outputs an instruction to the syringe pump to decelerate or to stop the pump feed until the Raman measurement has come to a result. In the event of a positive evaluation of the measurement result the pump operation is continued normally. In the case of a negative evaluation a corresponding warning is issued.

BRIEF DESCRIPTION OF THE DRAWING FIGURES

The invention will be described in detail in the following by means of a preferred embodiment with reference to the accompanying Figures.

FIG. 5 illustrates an exemplary Table of selectable substances/active substances classified according to Raman active and Raman inactive.

DETAILED DESCRIPTION

The following description relates to a preferred embodiment of an analysis automat/analysis device 1 in accordance with the invention, conceived for medical use for the detection of wrong fluids, solutions, active substances, or active substance combinations which are to be supplied to a patient via a supply device 2. Specifically, in the following a possibility will be described for identifying infusions during administering, for instance, by the supply device 2, or for at least detecting, pursuant to the exclusion procedure, that the infusion does not belong to a specified infusion assortment.

Figure 1:
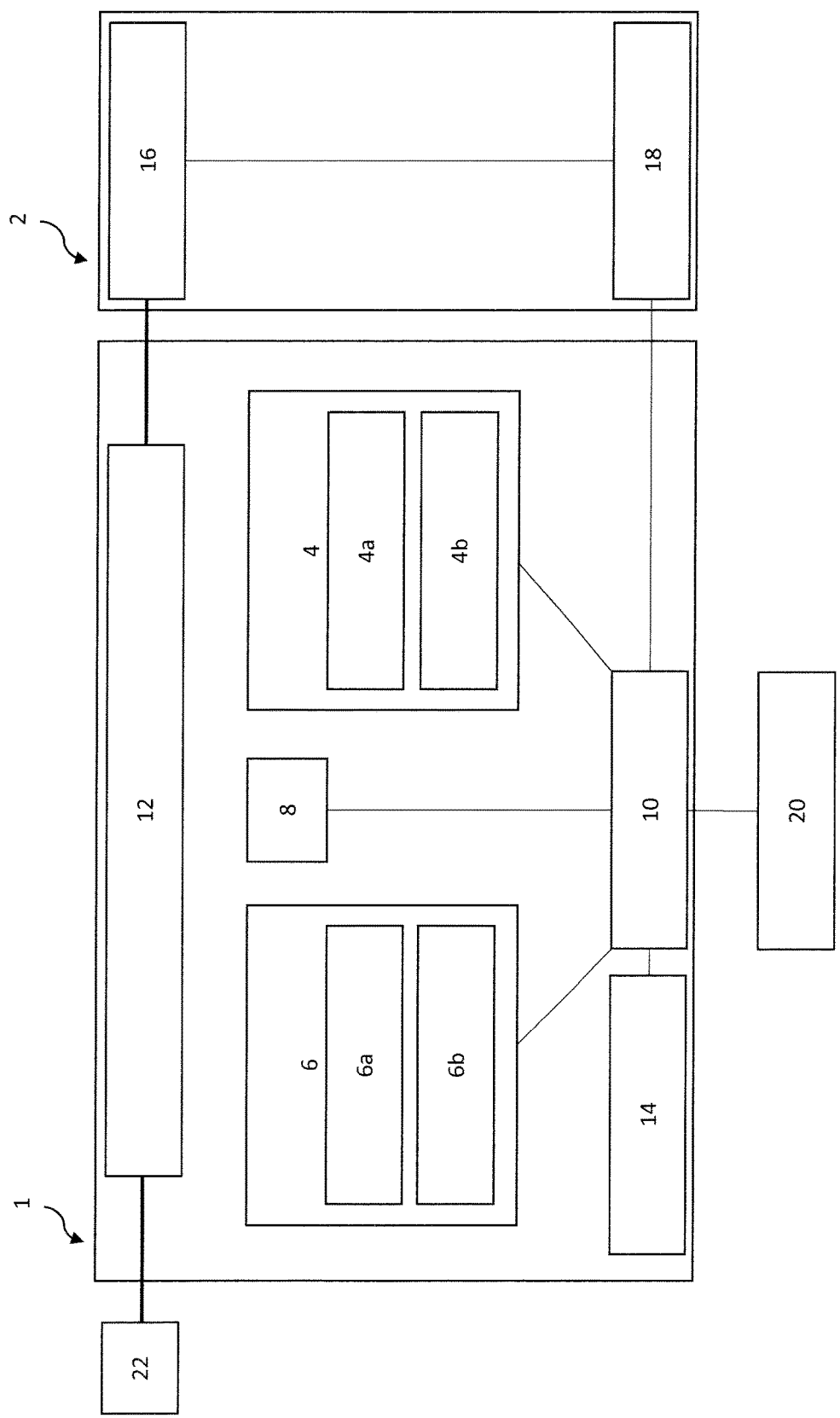
FIG. 1 illustrates a basic structure of an analysis device in accordance with a preferred embodiment of the present invention.
Figure 2:
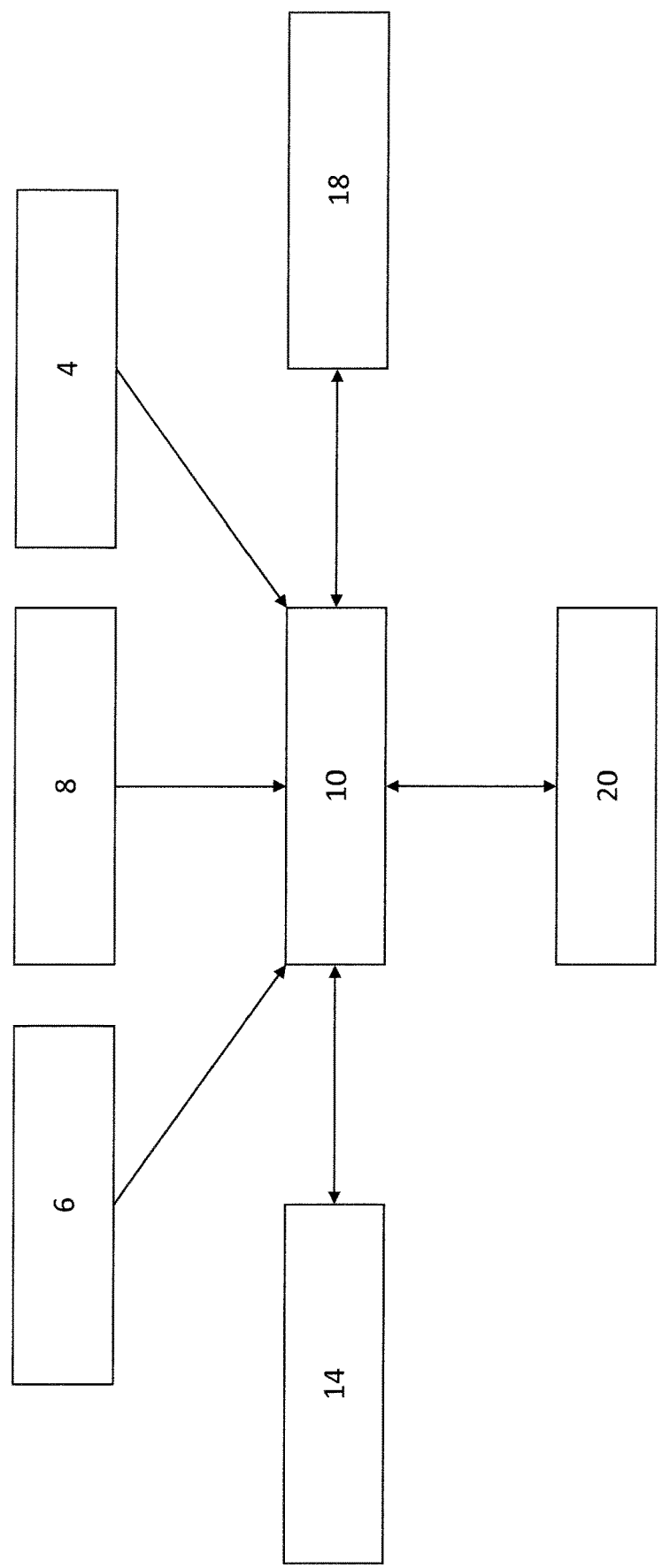
FIG. 2 illustrates the schematic data exchange between the computing unit of the analysis device and the Raman spectrometer, the refractometer and the temperature sensor.

FIGS. 1 and 2 illustrate a schematic structure of the analysis device 1 in combination with a supply device 2. The analysis device 1 comprises, preferably in one single housing (which is not illustrated), a Raman spectrometer 4 for measuring a Raman spectrum, a refractometer 6 for measuring a refractive index, a temperature sensor 8, a computing unit (processor/main computer) 10 for the processing of measured signals, a flow measuring cell 12 at which the measurements may be performed, and preferably an interface 14. The supply device 2 comprises a syringe pump 16 and preferably its own computing unit (processor) 18. The own computing unit 18 of the supply unit 2 is preferably connected with the computing unit (processor) 10 of the analysis device 1 and/or directly with a hospital-internal EDP 20. The fluid to be analyzed is supplied by the supply device 2 (more exactly the syringe pump 16) to the analysis device 1 and from there transferred to a patient 22. The fluid supply takes place via a hose/tube line suitable for the transport of drugs and/or infusion solution. In the analysis device 1 the fluid to be measured flows through the flow measuring cell 12 which may be conceived as a disposable article or as a reusable article.

Accordingly, the invention provides preferably a coupling of the Raman spectrometer 4, consisting, for instance, of a light source 4a, preferably a laser light source, a mirror, a lens opposite the mirror, a monochromator downstream of the lens, and a detector 4b, preferably a CCD chip, and the refractometer 6, consisting, for instance, of a light source 6a, preferably a laser light source, a lens following the light source, a prism following the lens, and a detector 6b downstream of the prism, preferably a CCD chip. Both measuring devices, whose basic structures belong to the generally known state of the art and may thus be assigned to the general expertise of a person having average skill in the art, are positioned at the flow measuring cell 12 which is connected hydraulically with the supply device 2 and deliver individual results which are, after data fusion, in accordance with the method described in the following, merged to a final result in the main computer/computing unit (processor) 10, said result in turn being compared with a spectrum and refractive index database which is preferably comprised in the analysis device 1 and which is connected to the computing unit (processor) 10. The result of this comparison is output as a total result to the medical data infrastructure (e.g. a hospital-internal EDP/hospital's EDP, a medical information system (MIS), and/or a patient file management system 20 and/or an interface 14 and/or a survival station. Preferably, the interface 14 is a touch screen (touch sensitive screen). The output of quality and quantity may be performed specifically by the device (integrated database). However, in the case of an inclusion in the hospital-internal EDP 20 a comparison of the total result or else of the end result may also be performed therewith (external database, for instance, connectable via the Internet).

Figure 3:
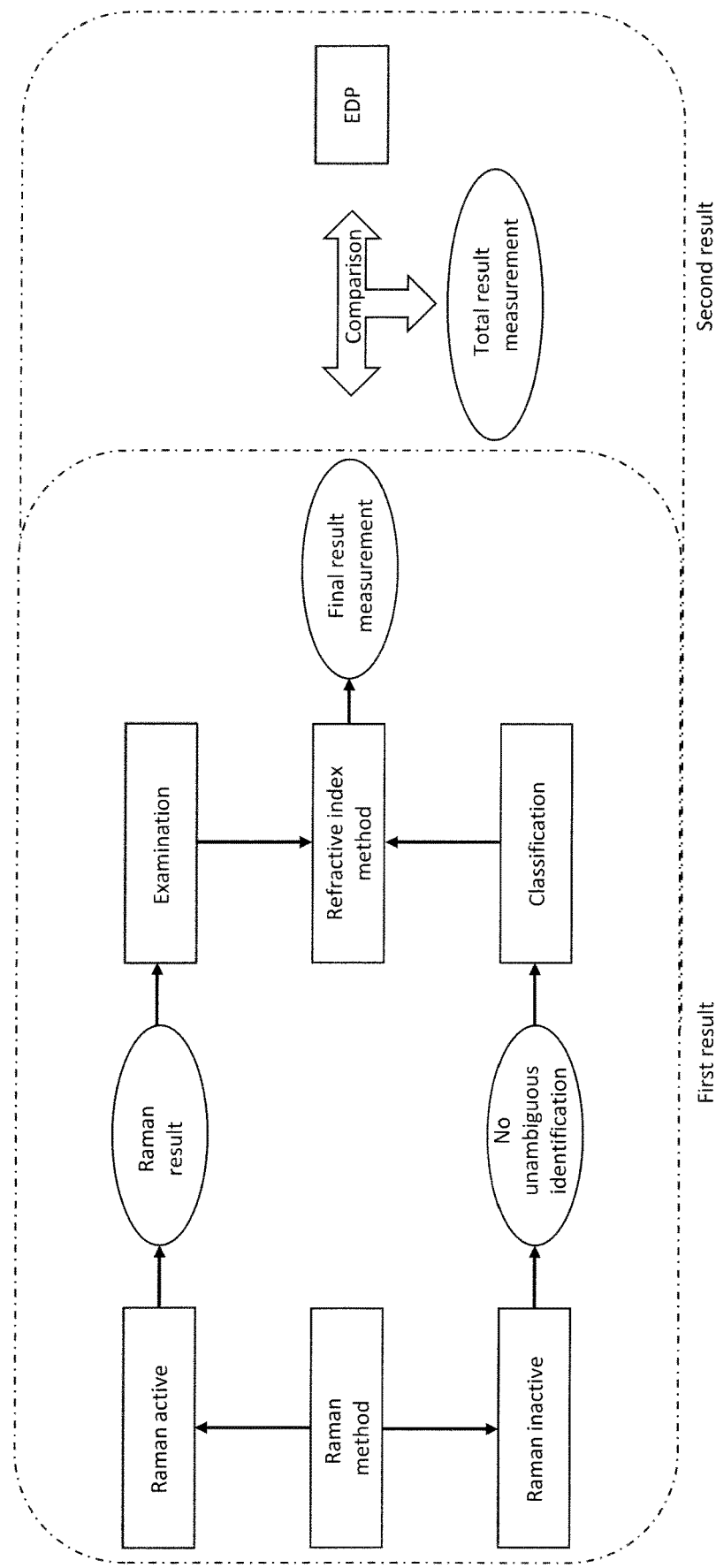
FIG. 3 illustrates a diagram for a fluid, active substance, active substance combination analysis in accordance with the present invention, preferably by using the analysis device pursuant to FIG. 1.

The drugs or active substances which are i.a. also available in solutions are analyzed within the flow measuring cell 12 in a Raman spectroscopic and a refractometric manner (serially). The results of the two measuring methods are, as illustrated in FIG. 3, combined with each other and compared with the spectrum and refractive index database. This then constitutes an intermediate result which is output by the analysis device 1. The output of the extended total result is performed subsequently after the comparison of the intermediate result (refer to: total result or else final result, cf. previous paragraph) with the hospital's EDP 20. The analysis is, however, not restricted to the serial performance, but may alternatively or additionally also be performed in parallel.

Many drugs/active substances/active substance components are basically detectable alone by means of Raman spectroscopy. However, aqueous solutions of NaCl and KCl cannot be differentiated readily by Raman spectroscopy. This disadvantage can be compensated for by refractometry. Thus, the standardized aqueous solutions of NaCl and KCl used in medicine can be differentiated unambiguously from each other.

The algorithms of the evaluation of the Raman spectra identify, preferably by means of peak analysis with subsequent comparison with an internal and/or external database, the composition and the amount of drug/active substance in the solution. The result of the Raman measurement enables a qualification and quantification for Raman active substances. Refractometry serves in this case the verification of the Raman result. The result of the quantification is at the same time verified and optimized.

For Raman inactive substances this is not directly possible. Here, the qualification and quantification is alone incumbent on refractometry. In this case a classification is only performed by refractometry (without verification by another measuring method).

The result of the measurements pursuant to the two measuring methods mentioned is compared with a spectra and refractive index database. This intermediate result may be output by the analysis device, as was already explained before. The result of the comparison may, however, also be compared with the hospital's EDP 20 and be output as an extended result.

Figure 4:
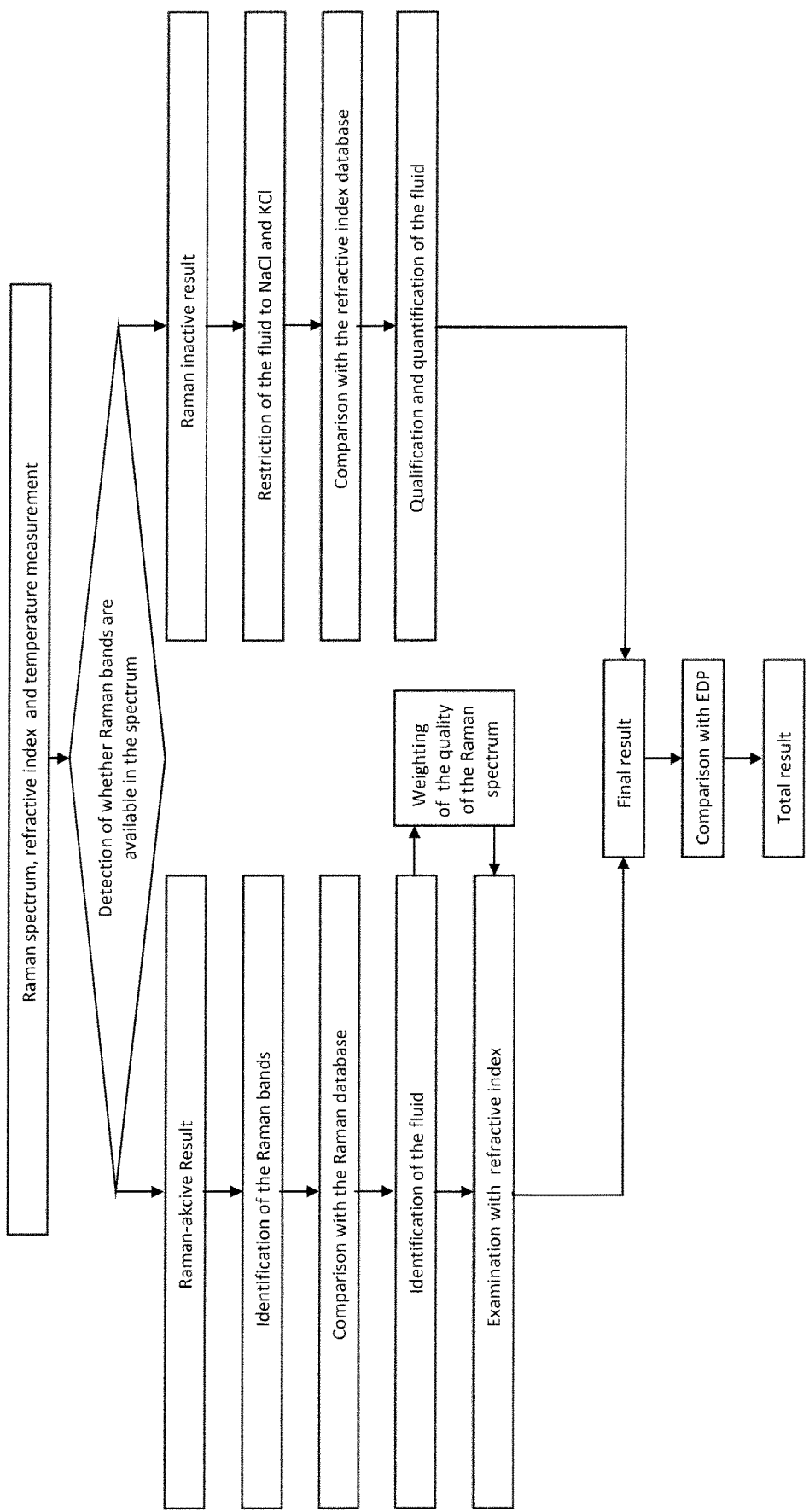
FIG. 4 illustrates an example of detailed method steps of the analysis device pursuant to FIG. 1.

The handling of the analysis device 1 in practical use is comparatively simple: Normally, medical specialists clamp the flow measuring cell 12 into the analysis device 1. The two measuring devices described measure the medication pursuant to FIG. 4 and compare it with the (internal) spectrum and refractive index database after evaluation and data fusion. The resulting intermediate result may be output directly at an interface 14. It may, however, also take place in comparison with the hospital's EDP 20. In the event of a discrepancy between the detected medication data and the medication data available in the hospital's EDP 20 an alarm may be triggered. In both cases the medical specialists may interfere and prevent/stop the wrong medication.

Concretely, the analysis device 1 measures the Raman spectrum, the refractive index, and preferably the temperature. The analysis device 1 identifies by means of mathematical methods whether and, in the affirmative, which Raman bands are contained in the obtained Raman spectrum and differentiates them into Raman active and Raman inactive results.

If only Raman active substances or Raman active results are identified, the detected Raman bands are identified and compared with an internal and/or external Raman database. This comparison enables an identification of the substance/fluid and/or a concentration identification of the substance/fluid. Subsequently, the results of the refractive index are examined immediately for confirmation with an internal and/or external refractive index database. Alternatively, a weighting of the quality of the Raman spectrum may be performed beforehand. Then, a data fusion is performed to yield a final result.

If both, Raman active and Raman inactive substances are identified, the proceeding is in analogy to the Raman active substance inclusive of the examination of the refractive index for confirmation with an internal and/or external refractive index database, but now the step further comprises a classification for NaCl and KCl. However, during the examination of the refractive index the database inquiry is extended to Raman inactive substances such as NaCl and KCl.

If only Raman inactive substances are identified in the step of detecting the Raman bands in the Raman spectrum, the substances are restricted to NaCl and KCl for classification. After a comparison with the refractive index database the substance is qualified and quantified, which also leads to a final result again.

The enclosed FIG. 5 represents by way of example a Table of drugs/active substances as they are regularly administered in hospitals. These include e.g. sodium bicarbonate (shortly: NaBic), insulin and glucose, each in an aqueous solution. All the three substances mentioned recognizably comprise a Raman signature which basically enables a qualification and quantification. The substances NaCl and KCl in an aqueous solution do, however, not comprise an unambiguous Raman signature. Due to the non-existing Raman spectrum (apart from that of the water) it may be concluded conversely that no Raman active substances exist. As an example of Raman inactive substances NaCl and KCl may be indicated here. Aqueous NaCl and KCl solutions merely show the structure of water in the spectrum. Thus, they fall out of the set of the Raman active substances and form a subset of the Raman inactive substances.

By means of the refractive index all drugs/infusion solutions which belong to the set of the Raman inactive substances can subsequently be differentiated unambiguously. For the drugs/infusion solutions of the set of the Raman active substances refractometry is a confirmation of quality determination and an optimization of quantity determination.

Figure 6:
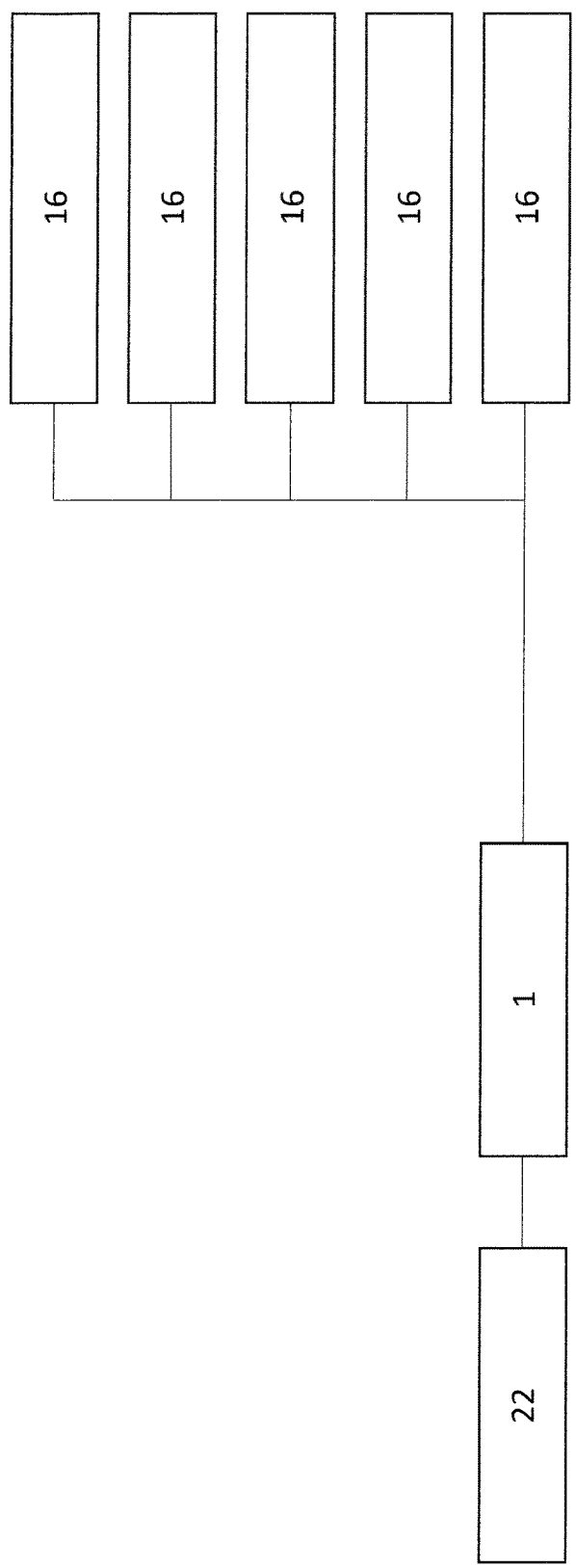
FIG. 6 to FIG. 8 illustrate different variants for the arrangement of the analysis device pursuant to FIG. 1 in an analysis circle.
Figure 7:
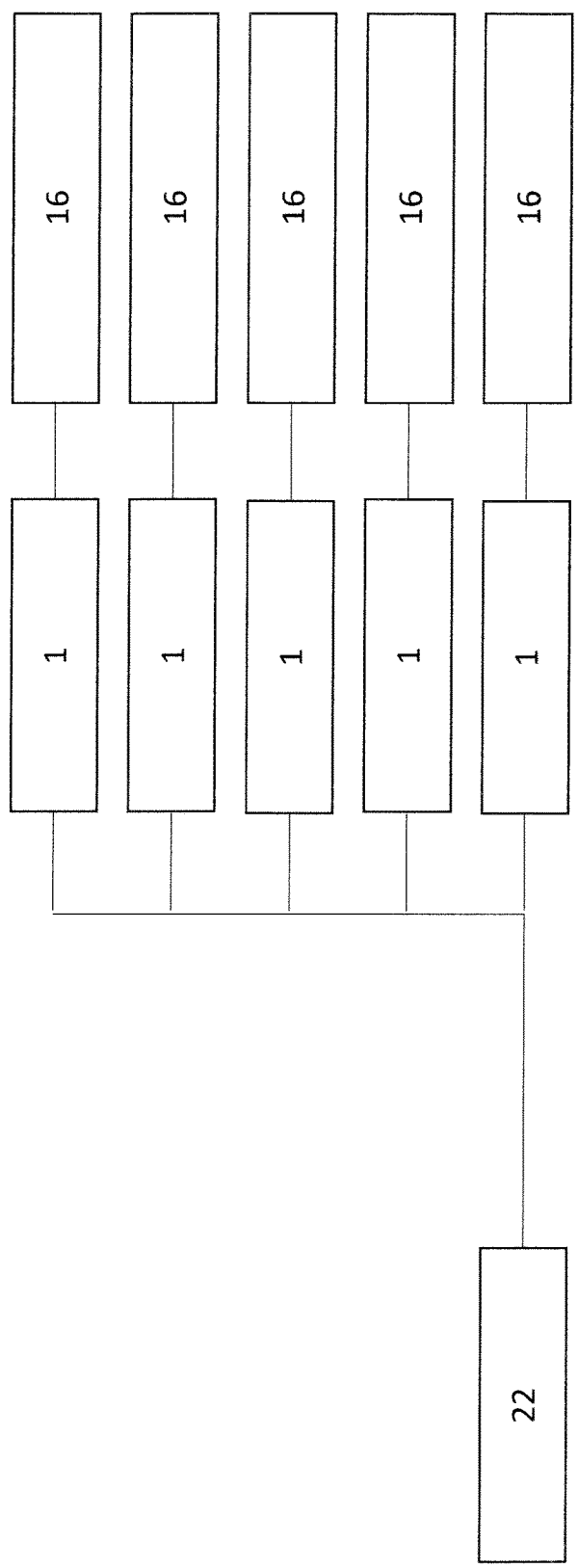
Figure 8:
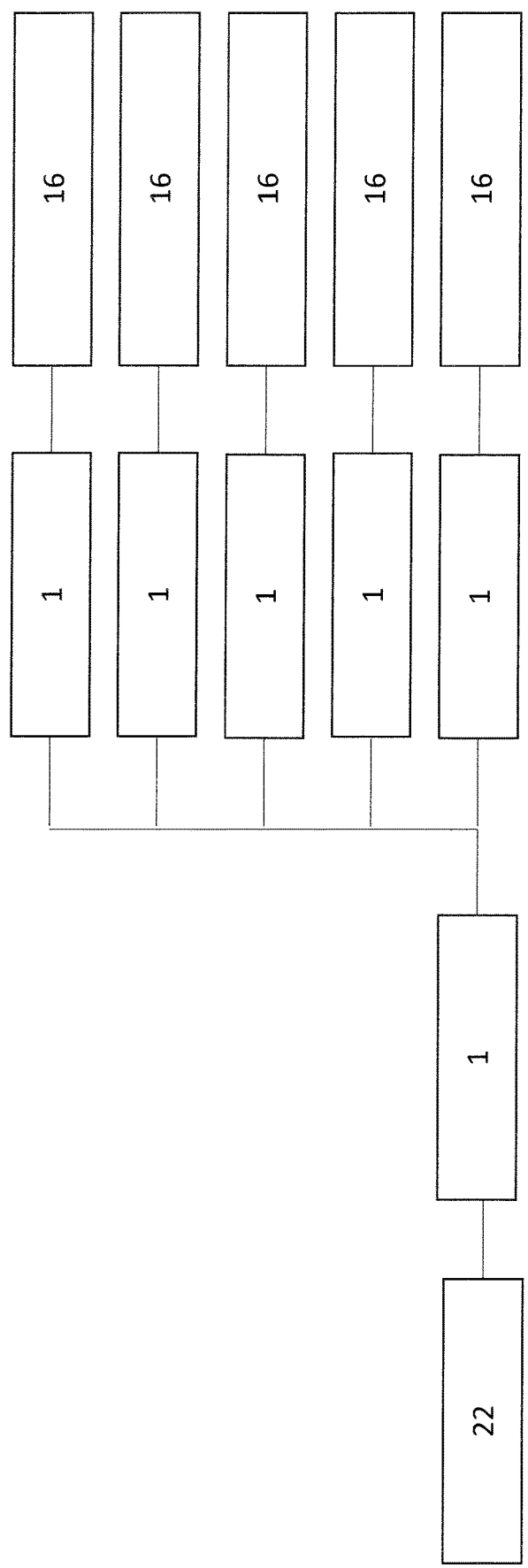

In FIGS. 6 to 8 the arrangement of the analysis device 1 in the fluid circle is illustrated schematically. The analysis device 1 may be connected directly upstream of the patient 22 and/or may be connected directly downstream of the supply device 2 (e.g. one single syringe pump 16). In the case of a plurality of supply devices a respective analysis device 1 may be positioned downstream of each supply device 2.

The invention claimed is:

1. A device for identifying fluids, preferably adapted to the medical use for identifying incorrect/unintended fluids, active substances, and/or active substance combinations especially in infusion containers, syringes/syringe pumps, and/or similar supply devices, comprising a computing unit, preferably a processor, that is connected to a Raman spectrometer, a refractometer, and a medical data infrastructure with a database in which a plurality of data sets are stored, said data sets representing specified or specifiable fluids, active substances, and/or active substance combinations, wherein the device is adapted so as to subject a selected or selectable fluid, active substance, and/or active substance combination to a Raman spectroscopy, and the computing unit is adapted so as to use the thus obtained first result to identify the selected fluid, active substance, and/or active substance combination as being Raman active or Raman inactive, wherein the device is additionally adapted so as to subject the selected fluid, active substance, or active substance combination to a refractive index measurement and thus to obtain a second result, and the computing unit is further adapted so as to perform a plausibility check of the first result by an examination of the second result with an internal and/or external refractive index database in the event of detecting Raman active and based on a result of the plausibility check to adopt either only Raman active substances or both Raman active and inactive substances as a final result in the event of detecting Raman active, and to adopt only Raman inactive substances as the final result in the event of detecting Raman inactive, and wherein the computing unit is finally adapted so as to compare the final result with the data sets stored in the database of the medical data infrastructure in order to thus identify an incorrect/unintended fluid, active substance, or active substance combination, and to correspondingly cause an alarm.

2. The device according to claim 1, wherein the device comprises a housing comprising the computing unit, the Raman spectrometer, the refractometer, and a temperature sensor which are connected with each other by data lines for the exchange of information, and a flow measuring cell through which the fluid to be identified flows.

3. The device according to claim 1, wherein the computing unit is adapted and provided so as to output a status notification to an operating element, preferably a touch screen.

4. A method for identifying incorrect/unintended fluids, active substances, and/or active substance combinations preferably in infusion containers, syringes/syringe pumps, and/or similar supply devices, further preferably by using a device according to claim 1, comprising the following method steps:

subjecting a selected or selectable fluid, active substance, or active substance combination to a Raman spectroscopic measurement for obtaining a first result, identifying components of the selected fluid, active substance, or active substance combination as being Raman active or Raman inactive on the basis of the first result, subjecting the selected fluid, active substance, or active substance combination to a refractive index measurement for obtaining a second result, checking the second result with an internal and/or refractive index database for a plausibility check of the first result in the event of detecting Raman active and based on a result of the plausibility check adopting either only Raman active substances or both Raman active and inactive substances as a final result in the event of detecting Raman active, or adopting the second result as the final result in the event of detecting Raman inactive, and comparing the final result with a plurality of data sets stored in a database in order to thus identify an incorrect/unintended fluid, active substance, or active substance combination and to correspondingly cause an alarm.

5. The method according to claim 4, wherein a calibration step for calibrating the wavelength and the intensity of the Raman spectrometer and/or the refractometer is performed prior to the spectroscopy, preferably with a chemically stable fluid.

6. The method according to claim 4, wherein the quality of the Raman measurement data is determined.

7. A device for identifying fluids, preferably adapted to the medical use for identifying incorrect/unintended fluids, active substances, and/or active substance combinations especially in infusion containers, syringes/syringe pumps, and/or similar supply devices, comprising a computing unit, preferably a processor, that is configured to be connected to a Raman spectrometer, a refractometer, and a medical data infrastructure with a database in which a plurality of data sets are stored, said data sets representing specified or specifiable fluids, active substances, and/or active substance combinations, wherein the device is adapted so as to subject a selected or selectable fluid, active substance, and/or active substance combination to a Raman spectroscopy, and the computing unit is adapted so as to use the thus obtained first result to identify the selected fluid, active substance, and/or active substance combination as being Raman active or Raman inactive, wherein the device is additionally adapted so as to subject the selected fluid, active substance, or active substance combination to a refractive index measurement and thus to obtain a second result, and the computing unit is further adapted so as to perform a plausibility check of the first result by checking of the second result with an internal and/or external refractive index database in the event of detecting Raman active and based on a result of the plausibility to adopt either only Raman active substances or both Raman active and inactive substances check as a final result in the event of detecting Raman active and to adopt only Raman inactive substances as the final result in the event of detecting Raman inactive, wherein the Raman active substances are identified by comparing the first result with an internal and/or external Raman/ spectrum database and the Raman inactive substances are identified by comparing the second result with the internal and/or external refractive index database, and wherein the computing unit is finally adapted so as to compare the final result with the data sets stored in the database of the medical data infrastructure in order to thus identify an incorrect/unintended fluid, active substance, or active substance combination, and to correspondingly cause an alarm.

* * * * *